Patented Oct. 2, 1951

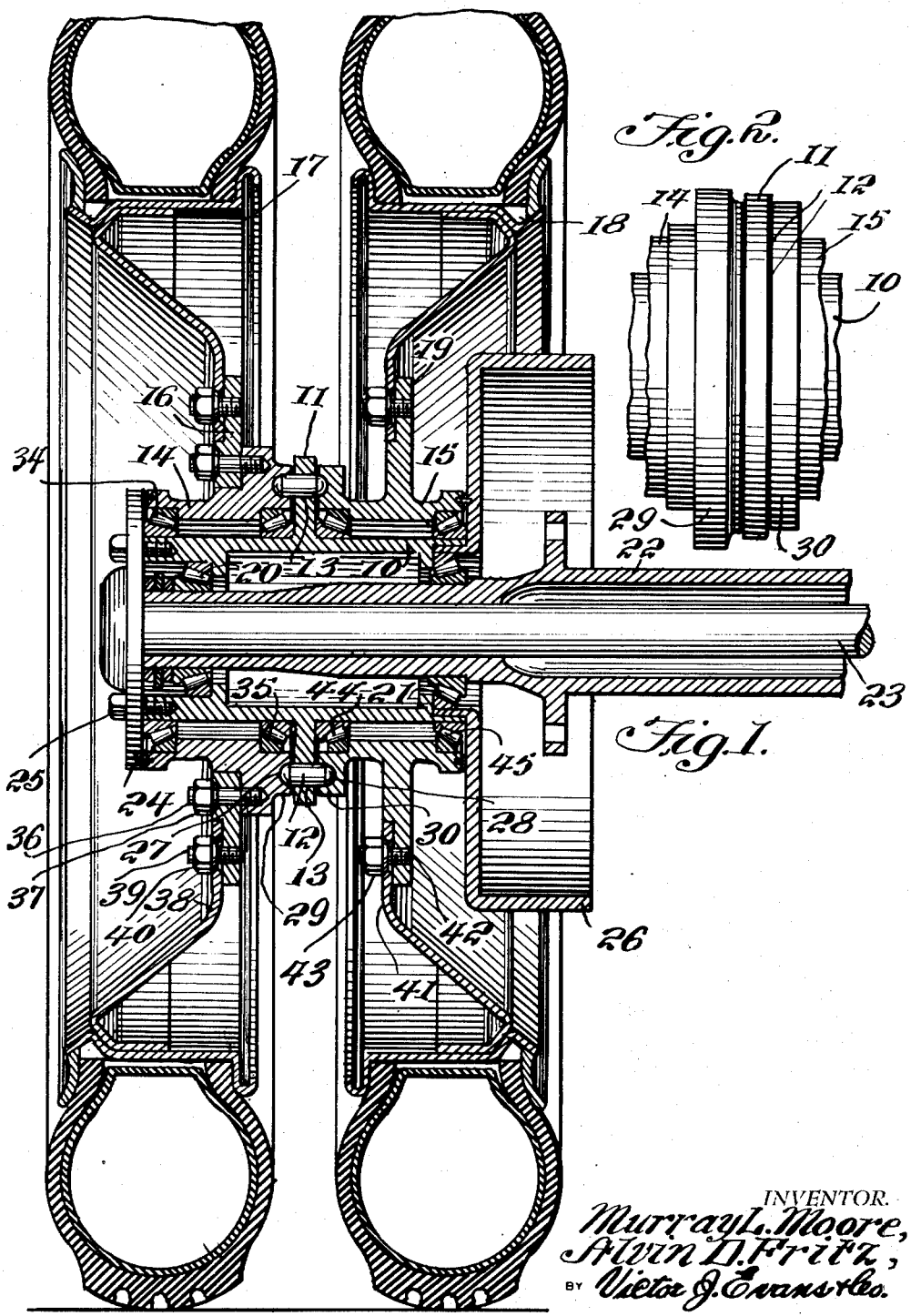

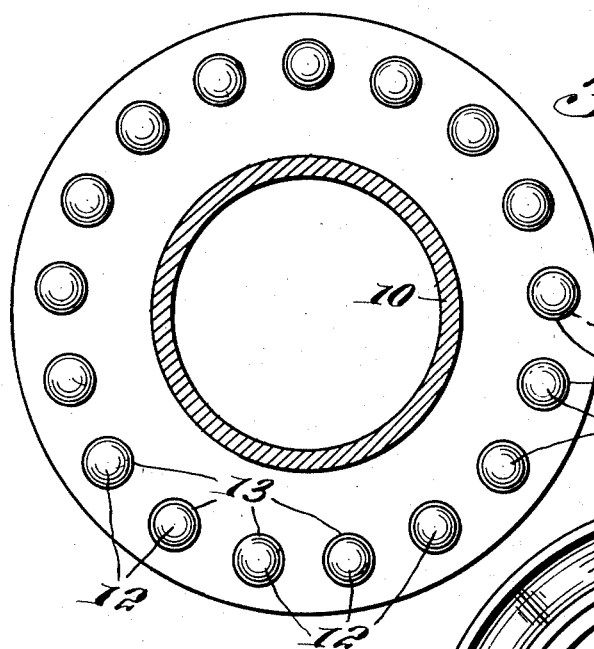
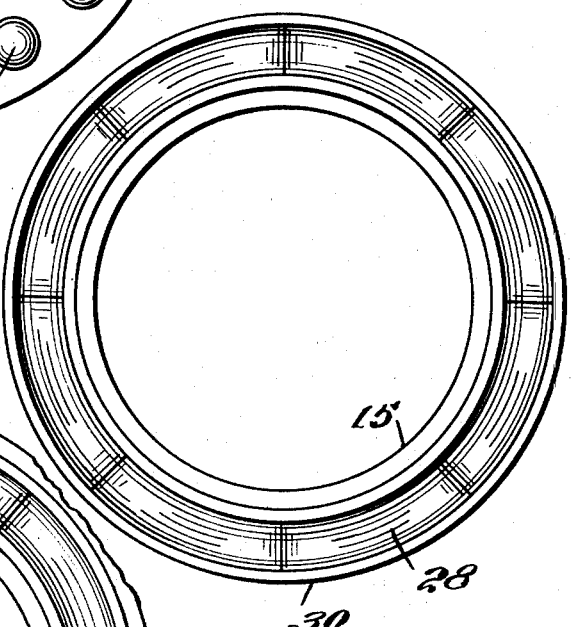
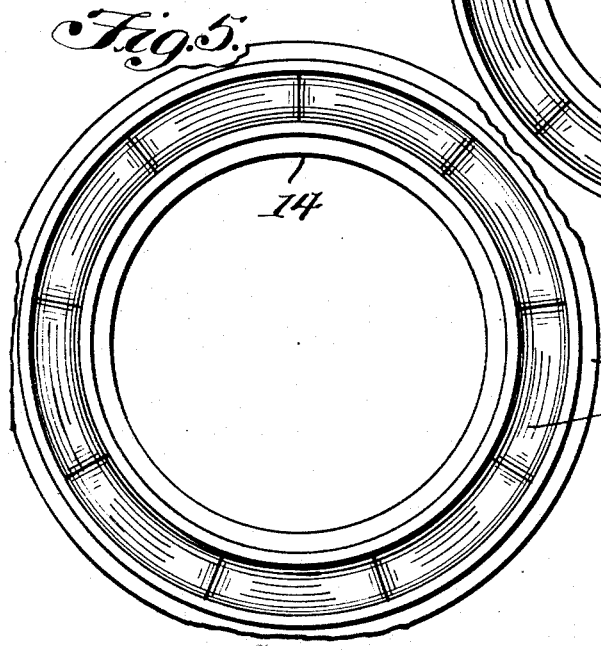

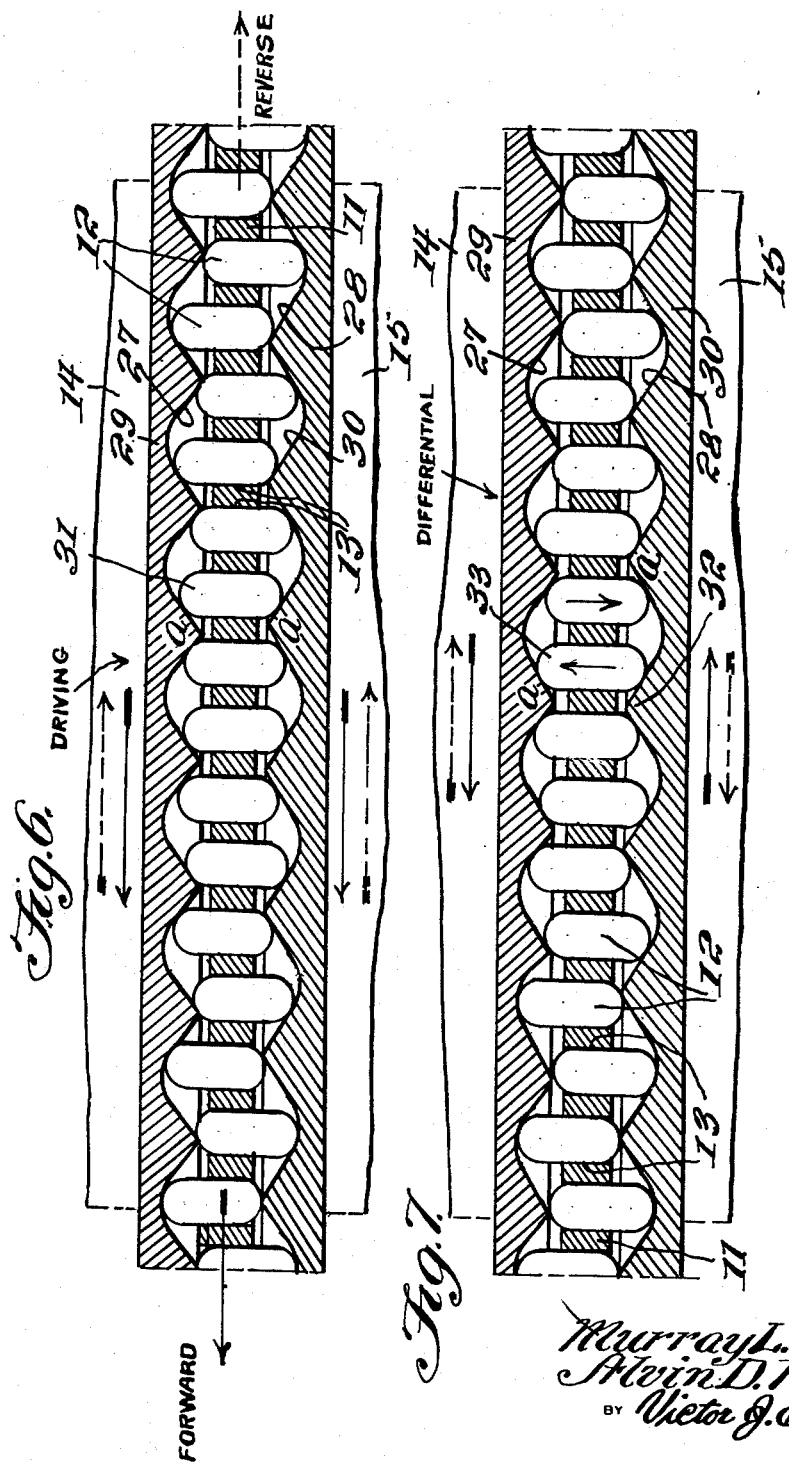

2,569,861

UNITED STATES PATENT OFFICE 2,569,861

DUAL WHEEL DIFFERENTIAL HUB

Murray L. Moore and Alvin D. Fritz,
Cheyenne, Wyo.

Application November 29, 1948, Serial No. 62,456

2 Claims. (Cl. 301—36)

This invention relates to wheel mounting hubs particularly for mounting dual wheels on front and rear axles of trucks, buses, and the like, and in particular the invention relates to means in a wheel mounting for providing a differential action whereby the surface speed of the tires may vary in traveling around curves while the same driving force is applied to both tires.

The purpose of this invention is to improve the construction of wheel mounting hubs for dual wheels so that one wheel may travel at a different speed than the other.

In the usual type of dual wheel, both tires travel at the same speed and in traveling around curves one of the tires must slide on the paving which causes excessive wear on the surface of the tire. With this thought in mind, this invention contemplates an improved hub for dual wheels wherein both wheels are driven by a common flange positioned between the wheels with transversely disposed pins carried by the flange and coacting with raceways in the hubs of the wheels in which the raceways are formed with alternately positioned high and low points whereby one wheel is permitted to turn in relation to the other.

The object of this invention, is therefore, to provide means for incorporating a differential action in the hub of dual wheels to compensate for the different speeds of the wheels in traveling around corners.

Another object of the invention is to provide an improved differential hub for dual wheels that may be used on axles of the live or dead type and that may also be used on both front and rear axles.

Another object of the invention is to provide a differential hub for dual wheels of motor vehicles which provides a greater area of contact than that of the conventional spider gear differential.

Another object of this invention is to provide an improved hub for dual wheels of motor vehicles which provides a differential action between the wheels and in which braking power is applied to both wheels.

Another object of the invention is to provide an improved hub for dual wheels of motor vehicles in which a differential action is provided and through which power is applied equally to both wheels.

A further object of this invention is to provide an improved dual wheel hub with a differential action incorporated therein which is of a comparatively simple and economical construction.

With these and other objects and advantages in view, the invention consists of the new and useful combination, construction and arrangement of parts as hereinafter more fully described, set forth in the claims appended hereto and disclosed in the accompanying drawings forming part hereof, wherein:

Figure 1 is a longitudinal section through the improved differential hub showing dual wheels mounted thereon, showing the hub mounted on the end of an axle and with a brake drum attached thereto;

Figure 2 is a detail illustrating an elevational view of the central part of the differential hub with the ends broken away and other parts omitted;

Figure 3 is a cross-section through the differential hub showing the circumferential flange with round end pins therein and with other parts omitted;

Figure 4 is an elevational view showing the raceway in a flange of one of the wheel mounting sleeves with high points therein indicated by radially disposed lines;

Figure 5 is a similar view showing the raceway in the flange of the other sleeve and with radially disposed lines indicating high points in the raceway, the number of high points in this raceway being greater than that of the number of high points in the raceway shown in Figure 4;

Figure 6 is a sectional view taken through the raceways and flange of the wheel hub with the parts opened out showing the round end pins and with two points of the raceways substantially aligned;

Figure 7 is a similar view illustrating the relative position of the parts with one wheel turned slightly in relation to the other.

Referring now to the drawings wherein like reference characters indicate corresponding parts, the improved differential mounting of this invention includes a hub 10 having a circumferential flange 11 with round end pins 12 slidably mounted in openings 13 therein, wheel mounting sleeves 14 and 15 and a removable ring 16 through which an outer wheel 17 is mounted on the sleeve 14, the inner wheel 18 being mounted on a flange 19 of the sleeve 15.

The hub 10 may be formed to accommodate axles of different types and in the design shown, the hub is mounted by bearings 20 and 21 on a housing 22 of an axle 23 and the outer end of the axle is provided with a cap 24 to which the outer end of the hub 10 is attached by bolts 25. A brake drum 26 is carried by the inner end of the hub 10 and it will be understood that the brake drum may be of any type or design and may be attached to the hub in any suitable manner.

The hub 10 is driven from the axle 23 through the cap 24 and bolts 25 and the wheels are driven through the round end pins 12, the ends of which extend into the raceways 27 and 28 of the flanges 29 and 30 of the sleeves 14 and 15 respectively, and with the vehicle traveling straight ahead, both wheels are driven as a unit. As illustrated in Figures 6 and 7, the pins 12 are free to travel backward and forward through the openings 13 and with one raceway having a greater number of high points than the other, the pins will assume different positions throughout the circumference or circular track formed on the pitch diameter of the pins. In Figure 6, the two high points "a" are shown opposite and a pin as indicated by the numeral 31 is shown locked against the surfaces of the points, however, as the flange 29 moves slightly in relation to the flange 30, the point "a" travels toward the left wherein it is illustrated as being aligned with a point 32 and in this position a pin as indicated by the numeral 33 may be considered as locked against the surfaces of the points. With the parts arranged in this manner, a drag or holding force of any kind on one of the wheels will cause this wheel to drop back as the other moves forward and the pins will slide back and forth through the openings in which they are mounted.

The raceways of the flanges 29 and 30 are illustrated in Figures 4 and 5, wherein the raceway 27 of the flange 29 is formed with nine high points and the raceway 28 of the flange 30 is provided with eight high points, and with the raceways of the flange provided in this manner, seventeen round end pins are used in the flange 11 of the hub. It will be understood, however, that the raceways may contain any suitable number of high and low points although the number of the high points in one raceway must be different from that of the number of high points in the other and the number of the round end pins is proportionately changed.

The outer sleeve 14 is rotatably mounted on the hub 10 through the bearings 34 and 35 and the ring 16 is attached to the flange 29 thereon by studs 36 with nuts 37. The web 38 of the wheel 17 is mounted on the sleeve through the ring, being attached to the ring by studs 39 with nuts 40 thereon. The web 41 of the wheel 18 is mounted on the flange 19 of the sleeve 15 by studs 42 with nuts 43, and the sleeve 15 is rotatably mounted on the hub 10 through bearings 44 and 45.

With the parts arranged in this manner, a differential action is provided in the hub of a dual wheel which permits movement of one wheel in relation to the other and the wheels may turn in either direction. The particular arrangement of the differential element provides a positive drive on both wheels in both forward travel and reverse and at the same time provides a differential that functions in both forward and reverse. The arrows shown in full lines on Figure 6 of the drawing indicate the movement of the elements with the vehicles traveling forward and the arrows indicated by the dotted lines indicate the movement of the parts with the vehicle traveling in reverse. The arrows shown in Figure 7 indicate the direction of movement of the elements with one wheel traveling at a speed different from that of the other.

It will be understood that modifications may be made in the design and arrangement of the parts without departing from the spirit of the invention.

What is claimed is:

1. A dual wheel differential mounting comprising a hub having a circumferential flange with spaced openings therethrough on the intermediate part thereof, inner and outer wheel mounting sleeves rotatably mounted on the hub and positioned on opposite sides of said circumferential flange, said sleeves having flanges on the inner ends thereof abutting the side surfaces of said circumferential flange and having raceways in the abutting faces therein registering with the spaced openings through the said circumferential flange and having high and low points, round end pins slidably mounted in the openings through the circumferential flange with the ends thereof in engagement with the high and low points of the raceways the inner sleeve having a circumferential wheel carrying flange on the outer surface positioned midway of the length thereof, and a wheel carrying flange removably mounted on the outer sleeve and positioned midway of the length thereof.

2. A dual wheel differential mounting comprising a hub having a circumferential flange with spaced openings therethrough on the intermediate part thereof, inner and outer wheel mounting sleeves rotatably mounted on the hub and positioned on opposite sides of said circumferential flange, said sleeves having flanges on the inner ends thereof abutting the side surfaces of said circumferential flange and having raceways in the abutting faces registering with the spaced openings through the said circumferential flange, and having high and low points therein, round end pins slidably mounted in the openings through the circumferential flange with the ends thereof in constant engagement with the high and low points of the raceways, the number of high and low points of the raceways of the flange of one sleeve being less than the number of high and low points of the flange of the other sleeve, the inner sleeve having a circumferential wheel carrying flange on the outer surface positioned midway of the length thereof, and a wheel carrying flange removably mounted on the outer sleeve and positioned midway of the length thereof.

MURRAY L. MOORE.
ALVIN D. FRITZ.

REFERENCES CITED

The following references are of record in the file of this patent:

UNITED STATES PATENTS

| Number | Name | Date |
| --- | --- | --- |
| 1,162,754 | Deegan | Dec. 7, 1915 |
| 2,135,568 | Durham et al. | Nov. 8, 1938 |
| 2,210,572 | Durham | Aug. 6, 1940 |
| 2,267,362 | Ash | Dec. 23, 1941 |
| 2,536,392 | Randall | Jan. 2, 1951 |

FOREIGN PATENTS

| Number | Country | Date |
| --- | --- | --- |
| 639,876 | Germany | Dec. 15, 1936 |